(12) United States Patent
Nakamura et al.

(10) Patent No.: US 6,630,757 B2
(45) Date of Patent: Oct. 7, 2003

(54) ELEVATOR HOIST APPARATUS

(75) Inventors: Kazuaki Nakamura, Tokyo (JP);
Hukami Aoki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/725,675

(22) Filed: Nov. 30, 2000

(65) Prior Publication Data

US 2001/0048253 A1 Dec. 6, 2001

(30) Foreign Application Priority Data

May 15, 2000 (JP) ........................................ 2000-141818

(51) Int. Cl.[7] .............................. H02K 9/14; H02K 5/20; B66B 11/08
(52) U.S. Cl. .......................... 310/62; 187/254; 254/362
(58) Field of Search ........................... 310/58–63, 89, 310/112, 105; 187/288, 254, 296; 254/362, 378

(56) References Cited

U.S. PATENT DOCUMENTS

| | | | |
|---|---|---|---|
| 3,715,610 A | * | 2/1973 | Brinkman .................... 310/58 |
| 4,009,405 A | * | 2/1977 | Gleichman ................... 310/58 |
| 4,182,966 A | * | 1/1980 | Mishra et al. ................ 310/59 |
| 4,526,252 A | * | 7/1985 | Hirano ........................ 187/254 |
| 4,960,186 A | * | 10/1990 | Honda ......................... 254/362 |
| 5,018,603 A | * | 5/1991 | Ito ............................... 187/254 |
| 5,244,060 A | * | 9/1993 | Tanaka et al. ............... 187/261 |
| 5,547,044 A | * | 8/1996 | Yamasaki .................... 187/254 |
| 5,939,805 A | * | 8/1999 | Vanduyn ...................... 310/58 |

FOREIGN PATENT DOCUMENTS

| | | |
|---|---|---|
| JP | 59-102786 | 6/1984 |
| JP | 9-56120 | 2/1997 |

* cited by examiner

*Primary Examiner*—Tran Nguyen
(74) *Attorney, Agent, or Firm*—Leydig, Voit & Mayer, Ltd.

(57) ABSTRACT

An elevator hoist apparatus including a ventilation passage within a motor frame includes an inlet suction port at one end, a flow passage extending through the motor, and upper and lower discharge ports at the lower end of the motor frame. The upper discharge port is at a position above the horizontal plane that includes the motor axis. The upper discharge port has an axis forming an angle of 45 degrees with the horizontal plane, and the lower discharge port is at a position below the horizontal plane. A blower is connected to each discharge port, thereby generating a substantially uniform flow of cooling air within the motor frame. Therefore, the flow of cooling air generated within the motor frame is substantially uniform, eliminating stagnation regions and uneven cooling, improving the cooling efficiency. Also, since blowers are disposed both above and below the horizontal plane, the load on a single blower is small, so a small-sized blower may be used and the overall size of the elevator hoist apparatus can be reduced.

7 Claims, 4 Drawing Sheets

ELEVATOR HOIST APPARATUS

BACKGROUND OF THE INVENTION

This invention relates to an elevator hoist apparatus and, more particularly, to an elevator hoist apparatus comprising a blower mounted on a motor frame of an electric motor for generating a flow of cooling air within a ventilation duct The entire content of the basic Japanese Patent Application from which the priority under the Convention is claimed in this application is hereby incorporated by reference into this application.

While Japanese Patent Laid-Open No. 59-102786 discloses one example of a conventional elevator hoist apparatus, FIGS. 7 and 8 of the present application are schematic front and side views, respectively, illustrating a conventional elevator hoist apparatus to which the present invention can be applied. In these figures, the elevator hoist apparatus comprises a base 1 constructed of welded U-shaped steel beams and an electric motor 4 secured to the base 1 via leg portions 2 and having a substantially hollow cylindrical motor frame 3 including an open end in the left side of FIG. 8 and a closed end in the right side of FIG. 8.

Motor frame 3 supports at its inner surface a stator 5 of the motor 4 and supports a rotor 6 at bearings 7 disposed on both its ends. The motor frame 3 also has defined therein a ventilation passage 8 for cooling the stator 5 and the rotor 6. The ventilation passage 8 extends from an inlet suction port 9 disposed at a first axial end of the motor frame 3 in relation to an axis A of the motor frame 3, through a flow passage indicated by arrows and extending along the stator 5 and the rotor 6 to a discharge port 10 disposed at a second axial end of the motor frame 3.

The elevator hoist apparatus also comprises blowers 11 disposed to the motor frame 3 of the electric motor 4 for generating a flow (see arrows) of cooling air within the ventilation passage 8 and a sheave 12 rotatably supported by the bearings 7 in the motor frame 3 and driven by the electric motor 4. The other end of the sheave 12 is supported by a second bearing 14 on the bearing pedestal 13 secured to the base 1. Also, the bearing pedestal 13 includes a brake 15 so that a braking force may be applied to a brake disc 16 of the sheave 12.

In the conventional elevator hoist apparatus, the inlet suction port 9 of the ventilation passage 8 for the cooling air is disposed at the central portion of one axial end (left end as viewed in FIG. 8) of the motor frame 3 of the electric motor 4 and has a relatively large opening diameter as shown in FIG. 7, and two discharge ports 10 are disposed on the cylindrical portion of the motor frame 3 with their axes B at a circumferential position separated by 45 degrees for 'example' above the horizontal plane H including the axis A of the motor frame 3. Also, the blower 11 connected to the ventilation passage 8 for dissipating the heat generated inside of the motor 4 is mounted on the outer circumferential cylindrical portion of the motor frame 3 of the electric motor 4

SUMMARY OF THE INVENTION

The elevator hoist apparatus of the present invention comprises a base and an electric motor disposed on the base. The motor has a stator, a rotor and a hollow substantially cylindrical motor frame supporting the stator and the rotor, the motor frame having defined therein a ventilation passage for cooling the stator and the rotor. The elevator hoist apparatus also comprises a blower disposed to the motor frame of the electric motor for generating a flow of cooling air within the ventilation passage and a sheave disposed to the base and driven by the electric motor. The ventilation passage comprises an inlet suction port disposed at a central portion of one axial end of the motor frame, a flow passage extending along the stator and the rotor and a discharge port disposed at the other axial end of the motor frame. The discharge port comprises an upper discharge port disposed on the motor frame at a circumferential position separated by substantially 45 degrees above from the horizontal plane including a central axis of the electric motor and a lower discharge port disposed on the motor frame at a position below the horizontal plane. Further, the blower is connected to the each of the upper discharge port and the lower discharge port, thereby generating a substantially uniform flow of cooling air within the motor frame.

The upper discharge port and the lower discharge port may be disposed on the motor frame at positions circumferentially separated by substantially 45 degrees with respect to the horizontal plane.

The blower may be disposed on an outer circumferential surface of the motor frame or on an end surface of the other end of the motor frame.

The blower connected to the lower discharge port may be mounted to the motor frame.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Embodiment 1

Figure 1:
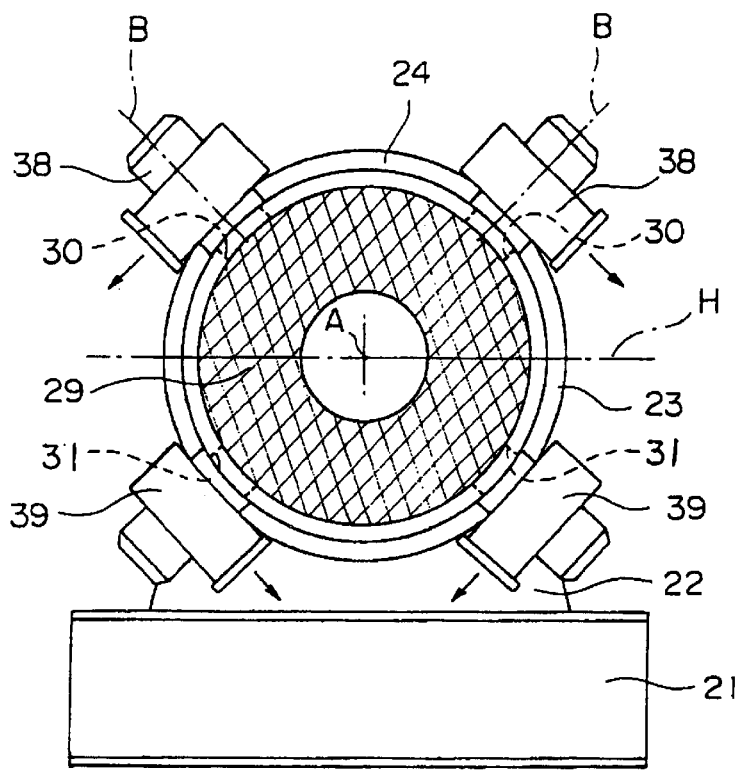
FIG. 1 is a schematic front view of the elevator hoist apparatus of the present invention.
Figure 2:
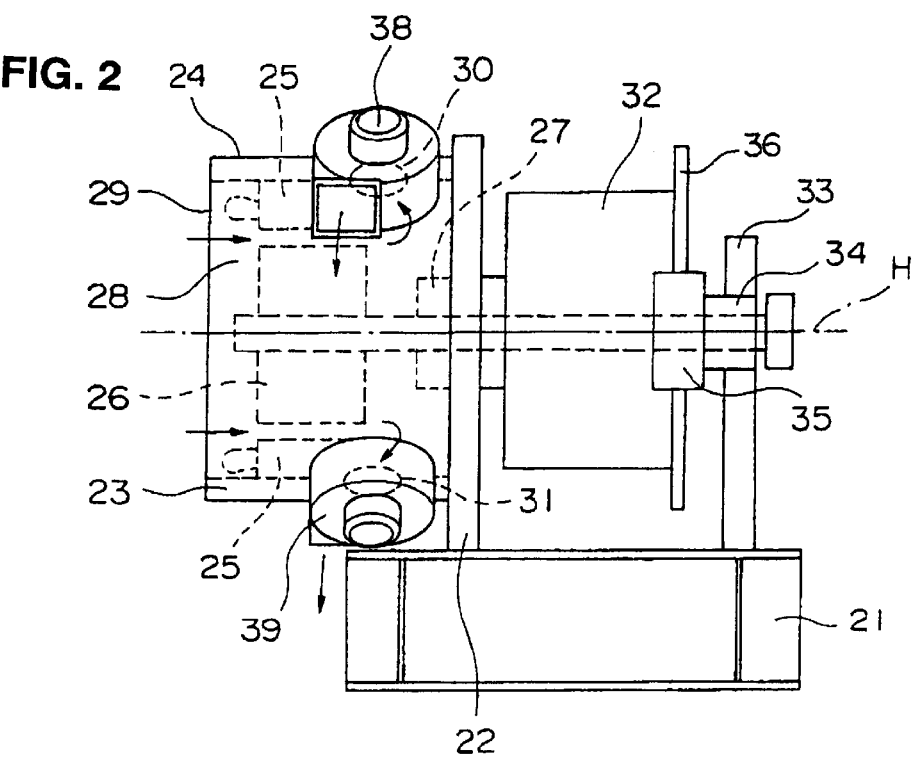
FIG. 2 is a schematic side view of the elevator hoist apparatus shown in FIG. 1.

FIGS. 1 and 2 schematically illustrate one embodiment of the elevator hoist apparatus of the present invention. The elevator hoist apparatus comprises a base 21 which is a bed constructed of welded U-shaped steel beams and an electric motor 24 secured to the base 21 via leg portions 22 and having a hollow substantially cylindrical motor frame 23 including an open end in the left side and a closed end in the right side as viewed in FIG. 2.

Motor frame 23 supports at its inner surface a stator 25 of the motor 24 and supports a rotor 26 at bearings 27 disposed on its both ends. The motor frame 23 also has defined therein a ventilation passage 28 for cooling the stator 25 and the rotor 26. The ventilation passage 28 extends from an inlet suction port 29 disposed at an axial end of the motor frame 23 in relation to an axis A of the motor frame 23, through a flow passage indicated by arrows and extending along the stator 25 and the rotor 26 to an upper discharge port 30 and a lower discharge port 31 disposed at the other axial end of the motor frame 23 and above and below a horizontal plane H passing through the axis A of the motor frame 23, respectively.

The elevator hoist apparatus also comprises blowers 38 and 39 disposed to the motor frame 23 of the electric motor 24 for generating a flow (see arrows) of cooling air within the ventilation passage 28 and a sheave 32 rotatably supported by the bearings 27 in the motor frame 23 and driven by the electric motor 24. The other end of the sheave 32 is supported by a second bearing 34 on the bearing pedestal 33 secured to the base 21. Also, the bearing pedestal 33 has provided with a brake 35 so that a braking force may be applied to a brake disc 36 of the sheave 32.

According to the elevator hoist apparatus of the present invention, the inlet suction port 29 of the ventilation passage 28 is disposed at a central portion of one axial end (left end in FIG. 2) of the motor frame 23 and has a relatively large opening diameter, and two upper discharge ports 30 are disposed on the cylindrical portion of the motor frame 23 at positions above the horizontal plane H including a central axis A of the motor frame 23, and two lower discharge ports 31 are disposed on the cylindrical portion of the motor frame 23 at positions below the horizontal plane H. Also, the blowers 38 and 39 connected to the ventilation passage 28 for dissipating the heat generated inside are mounted to an outer circumferential surface of the motor frame 23 of the electric motor 24 at angular positions of about 45 degrees for example with respect to the horizontal plane H.

In other words, the upper and the lower discharge ports 30 and 31 as well as blowers 38 and 39 are disposed to the cylindrical wall of the motor frame 23 at positions circumferentially separated by substantially 45 degrees from each other as clearly seen from FIG. 1. Therefore, the flow of cooling air generated within the motor frame 23 is substantially uniform, eliminating stagnation region and uneven cooling, improving the cooling efficiency. Also, since two blowers 38 and 39 are disposed each of the above and below the horizontal plane H, the load on a single blower is small, allowing a small-sized blower to be used and the overall size of the elevator hoist apparatus can be made small. Further, since the blowers 38 and 39 are separated in the circumferential direction of the motor frame 23 by 45 degrees, the amount of increase in height and width of the apparatus can be minimized.

While the upper and the lower discharge ports 30 and 31 as well as blowers 38 and 39 of the above embodiment shown in FIGS. 1 and 2 are circumferentially separated by substantially 45 degrees from each other and therefore they are at four separate mount positions, the angle of separation and the number of mount positions may be freely selected according to the design requirements. For example, they may be positioned at three mount positions with the separation angle of 60 degrees and with the lower discharge port positioned on a vertical plane including the axis A of the motor frame 23. In this case, the lower discharge port and the blower connected thereto may be accommodated within a open region of the frame-like base 21 to make the apparatus compact.

Embodiment 2

Figure 3:
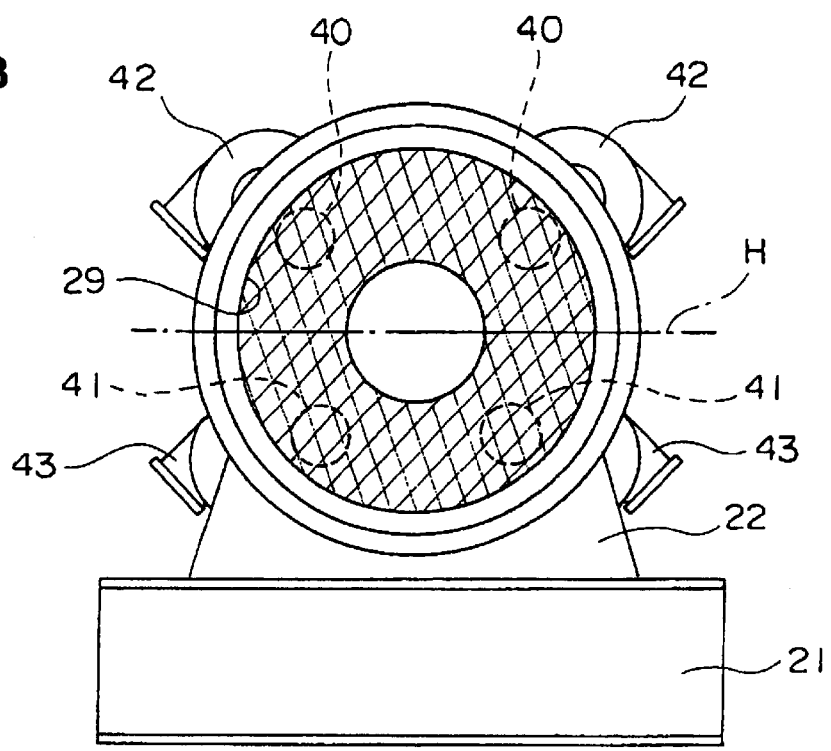
FIG. 3 is a schematic front view of the elevator hoist apparatus of another embodiment of the present invention.
Figure 4:
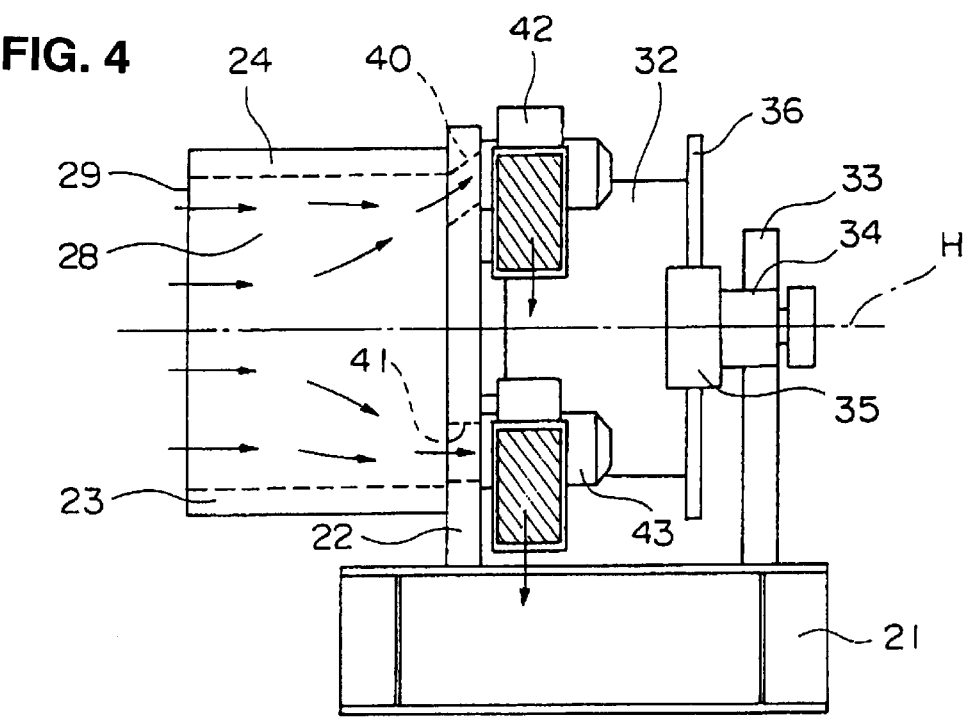
FIG. 4 is a schematic side view of the elevator hoist apparatus shown in FIG. 3.

In the elevator hoist apparatus illustrated in FIGS. 3 and 4, the blowers are disposed to the closed end surface of the other end of the motor frame. That is, the inlet suction port 29 of the ventilation passage 28 for the cooling air is disposed at a closed end of the other axial end (left end in FIG. 4) of the motor frame 23 of the electric motor 24 as shown in FIGS. 3 and 4 and has a relatively large opening diameter. Two upper discharge ports 40 are disposed on the cylindrical portion of the motor frame 23 at positions above the horizontal plane H including a central axis A of the motor frame 23, and two lower discharge ports 41 are disposed on the cylindrical portion of the motor frame 23 at positions below the horizontal plane H. Also, the blowers 42 and 43 connected to the ventilation passage 28 for dissipating the heat generated inside are mounted to the upper discharge port 40 and the lower discharge port 41 the closed end surface portion of the motor frame 23 of the electric motor 24 at angular positions of about 45 degrees for example with respect to the horizontal plane H.

In other words, the upper and the lower discharge ports 40 and 41 as well as blowers 42 and 43 are disposed to the circular end wall of the motor frame 23 at positions circumferentially separated by substantially 45 degrees from each other as clearly seen from FIG. 3. The blowers 42 and 43 are disposed such that their inlet suction ports are substantially in alignment with the direction of discharge port of the ventilation passage 28. Other structure is similar to that of FIGS. 1 and 2.

With such the arrangement, the flow of cooling air generated within the motor frame 23 is substantially uniform, eliminating stagnation region and uneven cooling, improving the cooling efficiency. Also, since two blowers 42 and 43 are disposed both above and below the horizontal plane H, the load on a single blower is small, allowing a small-sized blower to be used and the overall size of the elevator hoist apparatus can be made small. Further, since the blowers 42 and 43 as well as the upper and the lower discharge ports 40 and 41 are disposed on the circular end surface portion on the sheave side of the motor frame 23 through the use of the dimensional difference in the outer diameters of the motor frame 23 and the sheave 32, the outer diameter dimension of the elevator hoist apparatus can be made further smaller than that shown in FIGS. 1 and 2.

Embodiment 3

Figure 5:
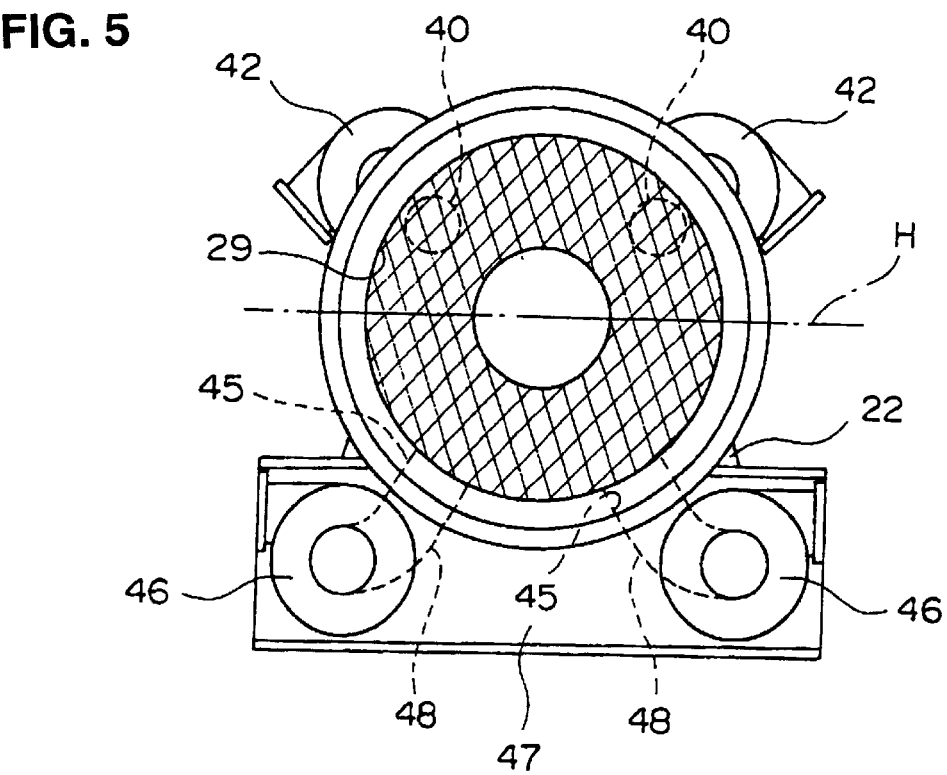
FIG. 5 is a schematic front view of the elevator hoist apparatus of still another embodiment of the present invention.
Figure 6:
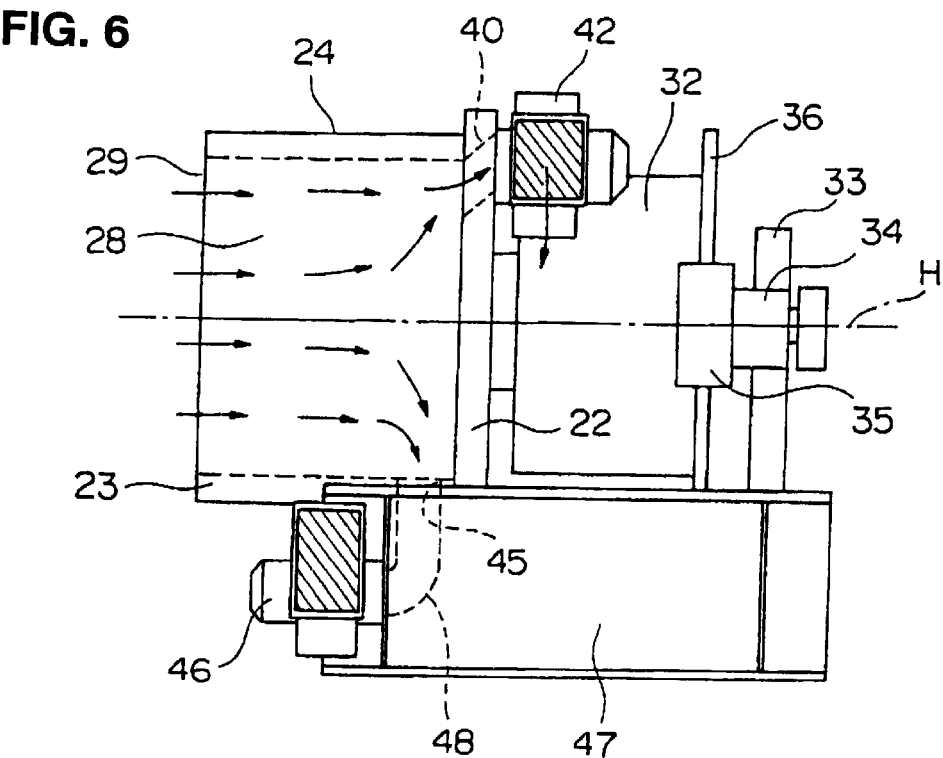
FIG. 6 is a schematic side view of the elevator hoist apparatus shown in FIG. 5.
Figure 7:
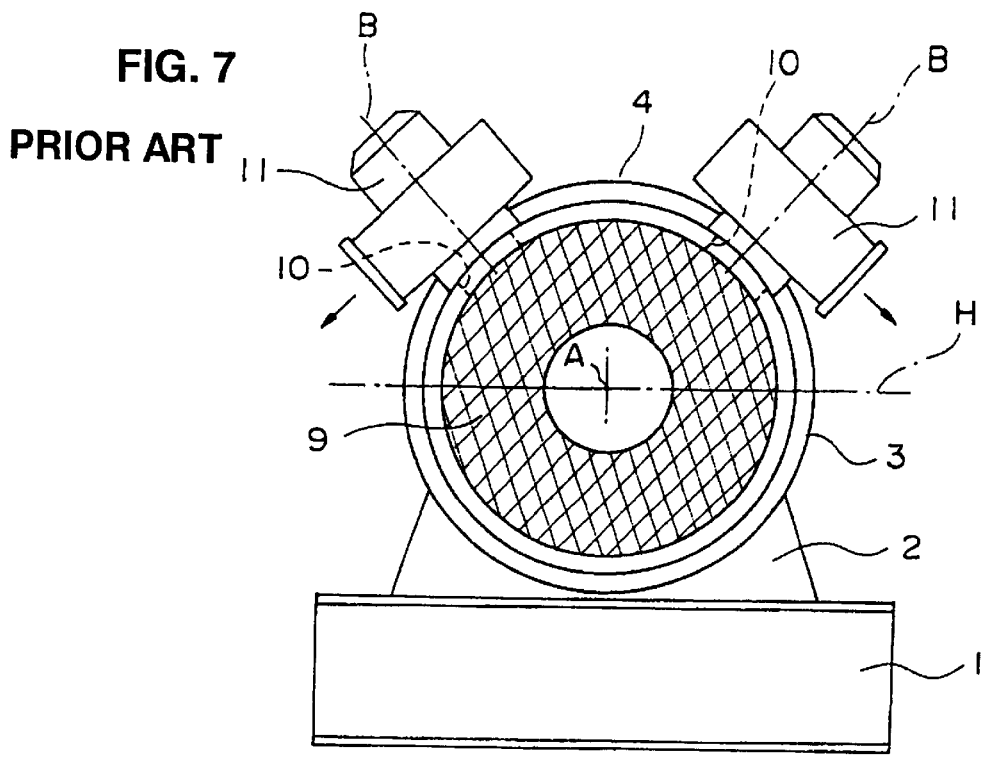
FIG. 7 is a schematic front view of the conventional elevator hoist apparatus.
Figure 8:
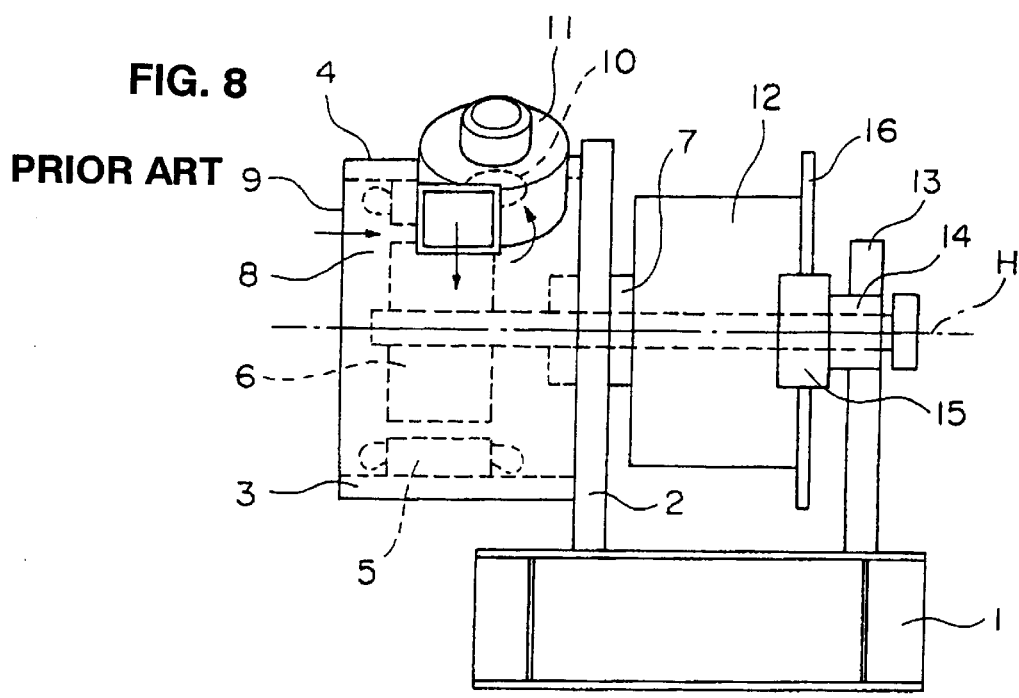
FIG. 8 is a schematic side view of the conventional elevator hoist apparatus shown in FIG. 7.

FIGS. 5 and 6 illustrate the elevator hoist apparatus in which the blowers 46 connected to the lower discharge ports 45 are mounted to the base 47. That is, while inlet suction ports 29 and the upper discharge ports 40 of the ventilation passage 28 for the cooling air as well as the blowers 42 connected to the upper discharge ports 40 are identical to those shown and described in conjunction with FIGS. 3 and 4, the lower discharge ports 45 and the blowers 46 connected thereto are disposed to the cylindrical wall portion of the other end of the motor frame 22 at the position below the horizontal plane H including the axis A of the motor frame 22.

It is to be noted in this embodiment that the blowers 46 connected to the lower discharge ports 45 are accommodated within the thickness dimension of the base 47 and secured to and supported by the base 47 and that the blowers 46 and the lower discharge ports 45 are connected together by connectors 48 such as suitable conduits or the like. While the connectors 48 are illustrated as being relatively long conduits in the illustrated embodiment, the blowers 46 may be positioned and mounted to the base 47 such that the inlet suction ports of the blowers 46 are substantially in alignment with and in opposition with the suction ports of the blowers 46, whereby they can be closely positioned with suitable packing material such as a spongy-rubber inserted between the suction ports of the blowers 46 and the lower discharge ports 45.

According to such the structure, the flow of cooling air generated within the motor frame 23 is substantially uniform, eliminating stagnation region and uneven cooling, thus improving the cooling efficiency. Also, since the load on a single blower is small, allowing a small-sized blower to be used and the overall size of the elevator hoist apparatus can be made small. Further, since the blowers 46 are supported by the base 47, the requirement on the mechanical strength for the motor frame 23 itself is low, making it possible to decrease the weight and the dimensions of the elevator hoist apparatus.

As has been described, according to the elevator hoist apparatus of the present invention, the ventilation passage comprises an inlet suction port disposed at a central portion of one axial end of the motor frame, a flow passage extending along the stator and the rotor and a discharge port disposed at the other axial end of the motor frame, and the discharge port comprises an upper discharge port disposed on the motor frame at a circumferential position separated by substantially 45 degrees above from the horizontal plane including a central axis of the electric motor and a lower discharge port disposed on the motor frame at a position below the horizontal plane, and further, the blower is connected to the each of the upper discharge port and the lower discharge port, thereby generating a substantially uniform flow of cooling air within the motor frame. Therefore, the flow of cooling air generated within the motor frame 23 is substantially uniform, eliminating stagnation region and uneven cooling, improving the cooling efficiency. Also, since two blowers are disposed both above and below the horizontal plane H, the load on a single blower is small, allowing a small-sized blower to be used and the overall size of the elevator hoist apparatus can be made small.

Also, the upper discharge port and the lower discharge port are disposed on the motor frame at positions circumferentially separated by substantially 45 degrees with respect to the horizontal plane, so that the increase of the height and width dimensions can be minimized.

Also, since the blowers are disposed on an outer circumferential surface of the motor frame, the increase of the height and width dimensions can be minimized.

Also, since the blowers are disposed on an end surface of the other end of the motor frame, the dimensional difference in the outer diameters of the motor frame 23 and the sheave 32 can be used to mount them on the circular end surface portion on the sheave side of the motor frame, so that the outer diameter dimension of the elevator hoist apparatus can be made further smaller than that shown in FIGS. 1 and 2.

Further, the blowers connected to the lower discharge ports are mounted to the motor frame, so that the requirement on the mechanical strength for the motor frame 23 itself is low, making it possible to decrease the weight and the dimensions of the elevator hoist apparatus.

What is claimed is:

1. An elevator hoist apparatus, comprising:

a base;

an electric motor disposed on said base and having a central axis, a stator, a rotor, and a substantially hollow cylindrical motor frame supporting said stator and said rotor and including a ventilation passage for cooling said stator and said rotor;

a blower disposed on said motor frame of said electric motor for generating a flow of cooling air within said ventilation passage; and a sheave disposed on said base and driven by said electric motor wherein said ventilation passage comprises an inlet suction port disposed at a central portion of a first axial end of said motor frame, a flow passage extending along said stator and said rotor, and a discharge port disposed at a second axial end of said motor frame;

said discharge port includes an upper discharge port having a center and disposed on said motor frame at a circumferential position, said upper discharge port is arranged in a manner, so that a line passing through the center of said upper discharge port and the central axis of said electric motor forms an angle of substantially 45 degrees with a plane parallel to said base and including the central axis of said electric motor, and a lower discharge port disposed on said motor frame on a side of the plane opposite the side on which said upper passage is located; and said blower is connected to said each of said upper discharge port and said lower discharge port, thereby generating a substantially uniform flow of cooling air within said motor frame.

2. The elevator hoist apparatus as claimed in claim 1, wherein said upper discharge port and said lower discharge port are disposed on said motor frame at positions circumferentially separated relative to the central axis of said electric motor by substantially 90 degrees.

3. The elevator hoist apparatus as claimed in claim 2, wherein said blower is disposed on an outer circumferential surface of said motor frame.

4. The elevator hoist apparatus as claimed in claim 2, wherein said blower is disposed on an end surface of the second axial end of said motor frame.

5. The elevator hoist apparatus as claimed in claim 1, wherein said blower is disposed on an outer circumferential surface of said motor frame.

6. The elevator hoist apparatus as claimed in claim 1, wherein said blower is disposed on an end surface of the second axial end of said motor frame.

7. The elevator hoist apparatus as claimed in claim 1, wherein said blower connected to said lower discharge port is mounted on said motor frame.

* * * * *